United States Patent [19]

Uuskallio

[11] Patent Number: 4,512,499
[45] Date of Patent: Apr. 23, 1985

[54] GAS CAP ASSEMBLY

[75] Inventor: Arvo F. Uuskallio, Hartland, Wis.

[73] Assignee: Briggs & Stratton Corp., Wauwatosa, Wis.

[21] Appl. No.: 627,116

[22] Filed: Jul. 2, 1984

[51] Int. Cl.$^3$ .............................................. B65D 41/04
[52] U.S. Cl. ..................................... 220/374; 220/367; 220/371; 220/DIG. 33
[58] Field of Search ............... 220/374, 373, 372, 370, 220/371, 369, 367, DIG. 33

[56] References Cited

U.S. PATENT DOCUMENTS

| 3,961,724 | 8/1976 | Kapsy ................................... 220/371 |
| 4,285,440 | 8/1981 | Adams .................................. 220/202 |
| 4,360,122 | 11/1982 | Sullivan .......................... 220/374 X |

FOREIGN PATENT DOCUMENTS

| 1912691 | 10/1970 | Fed. Rep. of Germany ...... 220/367 |
| 1016466 | 11/1952 | France ................................. 220/367 |
| 2303731 | 10/1976 | France ................................. 220/371 |
| 281391 | 1/1931 | Italy .................................... 220/374 |

Primary Examiner—Steven M. Pollard
Attorney, Agent, or Firm—Andrus, Sceales, Starke & Sawall

[57] ABSTRACT

A gas cap assembly for a gasoline tank. The gas cap assembly includes cup-shaped cap to be threaded on a neck bordering an opening in the tank. A tubular member is connected to the cap and extends inwardly of the tank with the lower end of the tubular member being generally conical and terminating in a drain opening. A plurality of ports are provided in the upper end portion of the tubular member adjacent the lower end of the cap. Located in the upper end of the tubular member is a conical member having an opening in its lower end that communicates with the interior of the tubular member. The outer surface of the conical member is provided with tangential surfaces disposed in registry with the ports in the tubular member, so that liquid and vapor entering the ports from the tank will engage the surfaces and be swirled outwardly within the tubular member, with the liquid flowing through the bottom opening in the tubular member while the vapor will pass upwardly through the opening in the conical member to the interior of the cap. A pair of domes are secured to the upper end of the cap and define an inner and outer chamber. The vapor with any entrained liquid droplets passes upwardly from the interior of the cap into the inner chamber and then through a central opening into the outer chamber. The side walls of the outer dome are provided with a series of openings having shields or deflectors which deflect any liquid exiting from the outer chamber downwardly along the outer surface of the cap assembly.

15 Claims, 4 Drawing Figures

GAS CAP ASSEMBLY

BACKGROUND OF THE INVENTION

With certain types of internal combustion engines, high temperature operation, along with agitation of the gasoline in the fuel tank can cause high pressure buildups in the tank. The high pressure buildup can result in an overly rich gas-air mixture being supplied to the carburetor which in turn can produce stalling of the engine. This applies in particular to engines having a vacuum suction carburetion system, where the fuel is drawn directly from the tank to the carburetor by vacuum created by air flow through the carburetor throat. When this type of engine is operated at elevated temperatures, above 85° F., for extended periods and when there is momentary agitation or sloshing of fuel in the tank, high pressure buildups can occur in the tank which must be rapidly vented. The pressure buildup can be aggravated in situations where the engine is enclosed by a hood, or in engines in which the exhaust system is located adjacent the fuel tank.

The high pressure buildup in the fuel tank, if not properly vented, can adversely effect engine performance. To vent the excessive pressure, gas caps have been provided in the past with vent passages or holes. The most common type of venting mechanism is a domed cap in which a dome is secured to the upper end of the cap to provide an upper chamber between the cap and the dome and a single central outlet is provided in the dome. In this type of construction, foam plastic has been located in the chamber to aid in separating liquid fuel from the vapor. However, under extreme pressure buildup conditions, liquid fuel is not adequately separated from the vapor so that liquid fuel may be discharged upwardly from the cap in the form of a liquid stream.

SUMMARY OF THE INVENTION

The invention is directed to an improved pressure relieving gas cap assembly which will more effectively separate liquid fuel from vapor and discharge the vapor to the atmosphere in a non-hazardous manner. In accordance with the invention, the cap assembly includes a generally cup-shaped cap which is threaded to the neck or flange bordering an opening in the fuel tank. Connected to the cap is a tubular member which extends downwardly from the cap into the tank, and the lower end of the tubular member is generally conical in shape and is provided with a drain opening. Ports are provided in the upper end of the tubular member adjacent the lower end of the threaded cap.

Positioned in the upper end of the tubular member is a conical member having an opening in its lower end which provides communication between the tubular member and the interior of the cap. The outer surface of the conical member is provided with tangential surfaces which are located in alignment with the ports in the tubular member so that the liquid and vapor fuel entering the ports from the tank during conditions of high pressure buildup will contact the tangential surfaces and be swirled outwardly within the tubular member thereby, aiding in the separation of the liquid and vapor. The separated liquid will flow downwardly within the tubular member through the drain opening back to the tank, while the vapor will pass upwardly through the opening in the conical member into the interior of the cap.

The cap assembly also includes a double-dome unit in which a nested inner dome and outer dome are connected to the cap. The space between the inner dome and the upper surface of the cap defines an inner chamber, while the space between the inner dome and the outer dome defines an outer chamber. A series of peripheral apertures provide communication between the interior of the cap and the inner chamber, while a central port in the inner dome establishes communication between the inner and outer chambers. A plastic foam material is contained within the inner chamber and aids in removing entrained liquid from the vapor as the vapor passas from the cap through the apertures into the inner chamber.

Discharge outlets are provided in the side of the outer dome and the discharge outlets are partially enclosed by baffles or shields so that any liquid fuel which has not been separated from the vapor will be directed downwardly along the side of the cap in a non-hazardous location.

The cap assembly of the invention provides a highly effective separation of liquid fuel from the vapor and prevents any liquid from being sprayed from the cap under extreme conditions. The cap assembly is formed with vent ports of a substantial cross sectional area to more quickly and effectively relieve pressure surges that may occur in the fuel tank.

As the discharge outlets on the outer dome are shielded, any liquid fuel being discharged from the cap will be directed downwardly along the outer surface of the cap where it will not be a hazard.

The cap assembly of the invention is of inexpensive construction having no moving parts and can be used with new fuel tanks, as well as being retrofitted to existing tanks.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
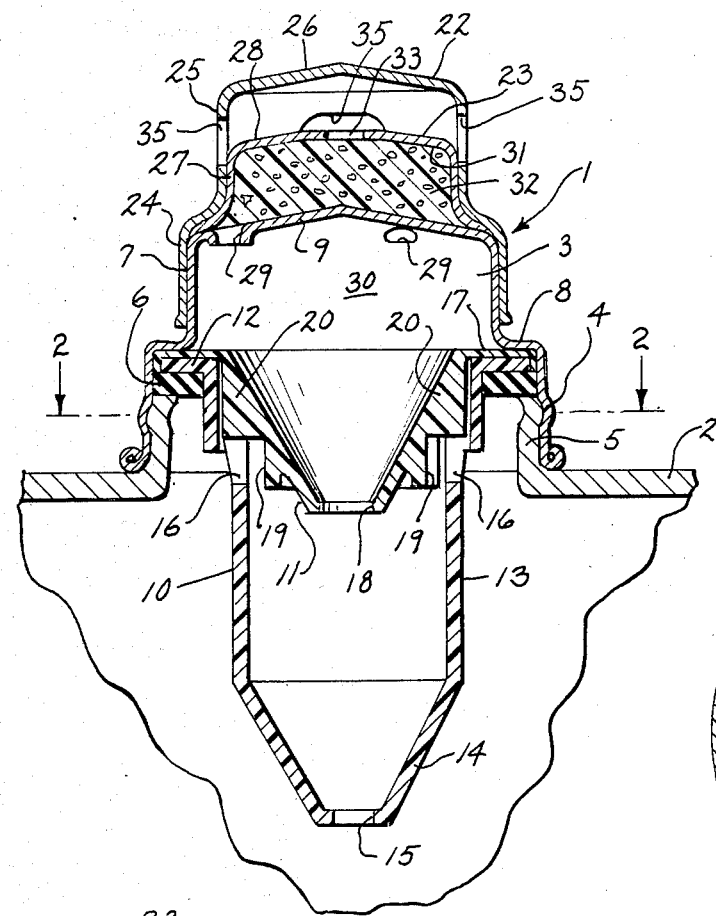
FIG. 1 is a vertical section of the cap assembly as attached to a fuel tank.
Figure 2:
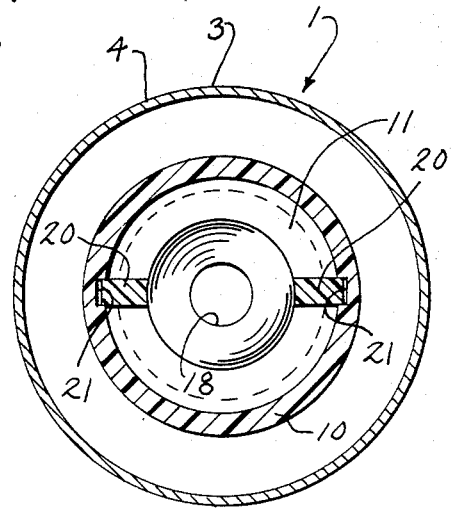
FIG. 2 is a section taken along line 2—2 of FIG. 1.

FIG. 1 illustrates a pressure relieving cap assembly 1 for a gasoline tank 2. Tank 2 is associated with an internal combustion engine, preferably a positive pumping carburetion type in which the fuel is pumped from tank 2 to the carburetor. The engine can be utilized with equipment such as generators, pumps, rototillers, blowers and vacuums.

Cap assembly 1 includes a generally cup-shaped cap or housing 3 having a threaded lower flange 4 which is threaded onto the neck or flange 5 bordering an opening in tank 2. A conventional gasket 6 is utilized to seal the joint at the threaded connection.

Cap 3 includes a generally cylindrical body 7 which is joined to the lower threaded portion 4 by a shoulder 8. Cap 3 also is formed with a dome-shaped head 9.

Mounted within the cap 3 is a tubular member 10 and a conical member 11. Tubular member 10 includes an outwardly extending upper flange 12 which bears against shoulder 8, and the tubular member also includes a cylindrical body 13 which extends downwardly from cap 3 into tank 2 and terminates in a conical lower end 14. A drain opening 15 is provided in lower end 14.

A pair of diametrically opposed ports 16 are formed in the upper end of the cylindrical body 13 above the upper surface of tank 2, and during conditions of pressure buildup in tank 2, liquid and vapor fuel can enter the tubular member 10 through the ports 16.

Conical member 11 has an upper outwardly extending flange 17 that bears against shoulder 8 and the lower end of conical member 11 is provided with a central opening 18. Formed on the outer surface of conical member 11 is a pair of generally tangential surfaces 19 which are located in alignment with ports 16 in tubular member 10. To provide proper registry between surfaces 19 and ports 16, the outer surface of conical member 11 is provided with one or more locating ribs 20 which are received within grooves 21 in the inner surface of tubular member 10. Engagement of ribs 20 with the grooves 21 in member 10 provides proper alignment of the surfaces 19 with ports 16.

Liquid fuel and vapor entering tubular member 10 through ports 16 will engage the surfaces 19 causing the liquid and fuel to be directed outwardly and downwardly along the inner surface of body 13 of tubular member 10. The swirling action will aid in separating the liquid from the vapor, with the liquid flowing downwardly and being discharged from drain opening 15 into the tank, while the vapor will pass upwardly through opening 18 into the interior 21 in cap 3.

The cap assembly of the invention also includes a double-domed construction composed of an outer dome 22 and an inner dome 23. The outer dome 22 includes an annular skirt or flange 24 which is press fitted to the cylindrical body 7 of cap 3, and the upper end of the cylindrical wall 25 of dome 22 terminates in a dome-shaped head 26.

Inner dome 23 is also provided with an annular flange or wall 27 which is press fitted to the cylindrical wall 25 of outer dome 22, and the inner dome has a curved head 28 formed integrally.

Figure 3:
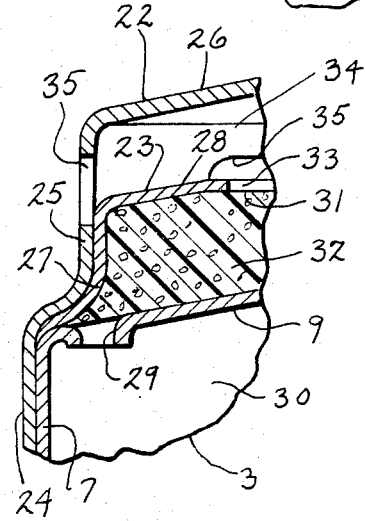
FIG. 3 is an enlarged fragmentary vertical section.
Figure 4:
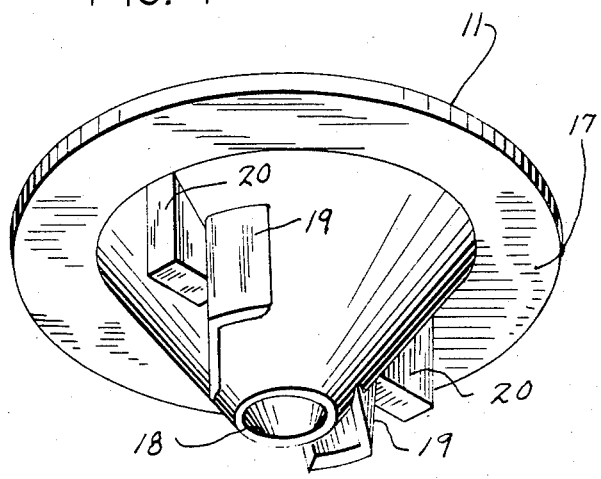
FIG. 4 is a perspective view of the conical member.

As illustrated in FIGS. 1 and 3 head 9 of cap 3 is formed with a plurality of holes 29 which are located adjacent the periphery of the head. Holes 29 provide communication between chamber 30 and the chamber 31 located between dome 9 and dome 23. Chamber 31 is filled with foam plastic material 32 which aids in separating liquid fuel droplets entrained in the vapor as vapor passes through chamber 31.

Head 28 of dome 23 is provided with a central opening 33 which communicates with chamber 34, and the cylindrical wall 25 of outer dome 22 is formed with a series of outlet ports 35. With the orientation of outlet ports 35, any remaining liquid fuel will be discharged downwardly along the outer wall of the cap in a relatively non-hazardous location.

As previously noted, the cap assembly of the invention has particular use with engines having a vacuum suction carburetor system where fuel is drawn directly from the tank to the carburetor by vacuum created by air flow through the carburetor throat. When engines of this type are operated at elevated temperatures, generally above 85° F. for extended periods, and when there is momentary agitation or sloshing of the fuel in the tank, high pressure buildup can occur in the tank. This high pressure buildup can be aggravated if the tank is enclosed with the engine in a hood or shroud, or if the tank is located in close proximity to the exhaust system.

Under these high temperature operating conditions and when momentary sloshing occurs, liquid and vapor fuel will enter the tubular member 10 through ports 16 and the liquid and vapor will be swirled within the tubular member by contact with the tangential surface 19. The swirling action will tend to separate the liquid and vapor, with the liquid flowing downwardly to the drain opening 15 and being returned to the tank, while the vapor passes upwardly through opening 18 into chamber 30. The vapor, containing entrained droplets of fuels, then passes upwardly through holes 29 into chamber 31 where the flow through foam plastic 32 will aid in removing the entrained liquid. The vapor, with any remaining entrained liquid, will then pass upwardly through opening 33 into the outer chamber 34 and be discharged through outlet ports 35 to the atmosphere. As previously noted, under extreme pressure conditions, if the discharged vapor should contain liquid, the liquid will be directed downwardly along the outer surface of the dome 22 in a non-hazardous location.

The cap assembly of the invention is an inexpensive construction having no moving parts which effectively separates liquid fuel from the vapor and prevents liquid spray from the tank under extreme pressure buildup conditions.

The cap assembly can be installed with new engines, as well as being retro-fitted to fuel tanks on existing engines.

Various modes of carrying out the invention are contemplated as being within the scope of the following claims particularly pointing out and distinctly claiming the subject matter which is regarded as the invention.

I claim:

1. A cap assembly to enclose an opening in a fuel tank, comprising a generally cup-shaped cap, a tubular member connected to the cap and extending downwardly from the cap, the lower end of the tubular member having a drain opening, port means in the upper end portion of said tubular member, a generally conical member disposed in the upper end of the tubular member and having a second opening in the lower end providing communication between the interior of the tubular member and the interior of said cap, swirling means disposed on the outer surface of the conical member in alignment with said port means for causing liquid fuel and vapor entering said port means to swirl within said tubular member, said swirling aiding in separating said liquid from said vapor with the liquid flowing downwardly through said drain opening and said vapor passing upwardly through said second opening to the interior of said cap, a dome connected to said cap and spaced upwardly from said cap, said cap having an aperture providing communication between the interior of the cap and the space between the cap and said dome, and outlet means disposed in the side portion of said dome to discharge vapor and any remaining liquid from said space.

2. The cap assembly of claim 1, wherein said cap has an annular threaded flange to be connected to a flange bordering the opening in the tank.

3. The cap assembly of claim 1, wherein the lower end of said tubular member has a conical interior surface terminating at said drain opening.

4. The cap assembly of claim 1, wherein said port means is disposed adjacent the lower end of said cap.

5. The cap assembly of claim 1, wherein said swirling means comprises a surface disposed on the exterior of said conical member, said surface extending generally tangentially of said conical member.

6. The assembly of claim 1, wherein said port means comprises a pair of holes in the upper end portion of said tubular member, said holes being diametrically opposed, said swirling means comprises a pair of surfaces disposed on the exterior of said conical member and aligned with the respective holes.

7. The assembly of claim 1, wherein said conical member includes a small diameter lower end bordering said second opening and a large diameter upper end communicating with the interior of said cap.

8. The cap assembly of claim 1, and including an inner dome spaced between the upper end of said cap and said first dome, the space between said cap and said inner dome defining an inner chamber and the space between the inner dome and said first dome defining an outer chamber, said aperture providing communication between the interior of said cap and said inner chamber, said inner dome having a second aperture providing communication between said inner and outer chambers.

9. The cap assembly of claim 8, and including a mass of foam plastic material disposed within said inner chamber.

10. The cap assembly of claim 1, and including deflector means associated with said outlet means to deflect any liquid and vapor being discharged through said outlet means in a downward direction.

11. A fuel tank construction, comprising a tank to contain fuel and having an opening therein, a cap assembly to enclose said opening, said cap assembly including a generally cup shaped cap, said cap having a generally cylindrical wall and a head enclosing the upper end of said wall, a tubular member connected to said wall, and extending downwardly from said wall into said tank, the lower end of said tubular member having a drain opening, a plurality of ports formed in the upper end of said tubular member adjacent the lower end of said wall a generally conical member disposed in the upper end of said tubular member and having a second opening in the lower end thereof, swirling means disposed on the outer surface of said conical member in alignment with each of said ports for causing liquid fuel and vapor entering said ports to be swirled outwardly along the interior surface of said tubular member, said swirling causing said liquid to be separated from said vapor with said liquid flowing downwardly along the inner surface of said tubular member and being discharged through said drain opening to said tank, and said vapor passing upwardly through said second opening to the interior of said cap, an inner dome attached to the upper end of said cap and spaced from said head to provide a first chamber therebetween, said head having a plurality of first apertures providing communication between the interior of said cap and said first chamber, a second dome attached to the first dome and spaced from the first dome to provide a second chamber therebetween, port means in said first dome providing communication between said first chamber and said second chamber, and outlet means disposed in the side surface of said second dome to discharge liquid and vapor fuel in a downward direction from said second chamber.

12. The construction of claim 11, and including deflector means associated with said outlet means to direct said liquid and vapor in a downward direction from said second chamber.

13. The construction of claim 12, wherein said deflector means comprises a baffle extending upwardly and inwardly from the lower edge of said outlet means.

14. The construction of claim 12, and including a mass of foam plastic material disposed in said first chamber.

15. A cap assembly to enclose an opening in a fuel tank comprising a generally cup-shaped cap having a head and an annular flange extending downward from said head, a first tubular separating member connected to said cap and projecting outwardly from said cap, the outer end of said first member having a first opening, port means in the inner end portion of said first member, a second separating member spaced concentrically within said first member, the outer end of said second member having a second opening providing communication between the interior of said first member and the interior of said cap, swirling means disposed on the outer surface of said second member in alignment with said port means for causing liquid fuel and vapor entering said port means to swirl within said tubular member, said swirling aiding in separating said liquid from said vapor with the liquid flowing downwardly through said first opening and said vapor passing upwardly through said second opening to the interior of said cap, a dome connected to said cap and spaced from said head, said head having an aperture providing communication between the interior of the cap and the space between the cap and said dome, and outlet means disposed in the side portion of said dome to discharge vapor and any remaining liquid from said space.

* * * * *